United States Patent
Liu et al.

(10) Patent No.: US 10,690,559 B1
(45) Date of Patent: Jun. 23, 2020

(54) PRESSURE SENSOR ARRAY AND THE METHOD OF MAKING

(71) Applicant: Flex Ltd., Singapore (SG)

(72) Inventors: Weifeng Liu, Dublin, CA (US); Jie Lian, San Jose, CA (US); Zhen Feng, San Jose, CA (US); Anwar Mohammed, San Jose, CA (US); Murad Kurwa, San Jose, CA (US)

(73) Assignee: Flex Ltd., Singapore (SG)

( * ) Notice: Subject to any disclaimer, the term of this patent is extended or adjusted under 35 U.S.C. 154(b) by 169 days.

(21) Appl. No.: 15/938,731

(22) Filed: Mar. 28, 2018

(51) Int. Cl.
  *G01L 5/16* (2020.01)
  *G01L 1/18* (2006.01)
  *H01M 4/02* (2006.01)

(52) U.S. Cl.
  CPC ............... *G01L 5/16* (2013.01); *G01L 1/18* (2013.01); *H01M 4/02* (2013.01)

(58) Field of Classification Search
  CPC . G01L 5/16; G01L 5/161; G01L 5/162; G01L 5/167; G01L 1/18; H01M 4/02; G01P 5/14; G01N 29/227; G01N 2291/02872
  USPC ...... 73/862.381, 862.37, 700, 715, 718, 719
  See application file for complete search history.

(56) References Cited

U.S. PATENT DOCUMENTS

| | | |
|---|---|---|
| 3,830,991 A | 8/1974 | Durocher |
| 4,017,697 A | 4/1977 | Larson |
| 4,492,949 A | 1/1985 | Peterson |
| 5,626,135 A | 5/1997 | Sanfillippo |
| 6,388,556 B1 | 5/2002 | Imai |
| 6,483,055 B1 | 11/2002 | Tanabe |
| 6,964,205 B2 | 11/2005 | Papakostas |
| 7,072,721 B1 | 7/2006 | Trent |
| 7,112,755 B2 | 9/2006 | Kitano |
| 7,528,337 B2 | 5/2009 | Tanabe |
| 7,578,195 B2 | 8/2009 | DeAngelis |
| 2006/0131158 A1 | 6/2006 | Takiguchi |
| 2006/0135863 A1 | 6/2006 | Birnbaum |
| 2008/0018611 A1 | 1/2008 | Serban |
| 2008/0139953 A1 | 6/2008 | Baker |
| 2009/0272197 A1 | 11/2009 | Ridao Granado |
| 2010/0006336 A1 | 3/2010 | Pisani |
| 2010/0107770 A1 | 5/2010 | Serban |
| 2010/0160762 A1 | 6/2010 | McLaughlin |
| 2010/0018507 A1 | 7/2010 | Jeong |
| 2012/0165633 A1 | 6/2012 | Khair |
| 2012/0238910 A1 | 9/2012 | Nordstrom |
| 2013/0019383 A1 | 1/2013 | Korkala |
| 2013/0060115 A1 | 3/2013 | Gehman |
| 2014/0015633 A1 | 1/2014 | Nakae |

(Continued)

*Primary Examiner* — Suman K Nath
(74) *Attorney, Agent, or Firm* — Haverstock & Owens LLP

(57) ABSTRACT

An electronic pressure sensor array has a plurality of conductive electrodes and interconnects selectively formed on a pressure sensor substrate to form a plurality of individual pressure sensor assemblies. The individual pressure sensor assemblies can be aligned in various configurations to form the electronic pressure sensor array. Each pressure sensor assembly is made of a plurality of layers including a pressure sensor substrate, insulating layers on either side of the pressure sensor substrate, and conductive ink layers on an outer surface of each insulating layer. A cavity is formed in each insulating layer, the cavity in one insulating layer being vertically aligned with the cavity in the other insulating layer, and conductive ink fills each cavity to form electrodes.

29 Claims, 7 Drawing Sheets

(56) References Cited

U.S. PATENT DOCUMENTS

| | | |
|---|---|---|
| 2014/0343390 A1 | 11/2014 | Berzowska |
| 2015/0366504 A1 | 12/2015 | Conner |
| 2016/0270727 A1 | 9/2016 | Berg |
| 2017/0172421 A1 | 6/2017 | Dabby |
| 2017/0315657 A1* | 11/2017 | Lai .................... G06F 3/0412 |
| 2018/0249767 A1 | 9/2018 | Begriche |
| 2019/0234814 A1* | 8/2019 | Yoon .................... H01B 3/42 |

* cited by examiner

PRESSURE SENSOR ARRAY AND THE METHOD OF MAKING

FIELD OF THE INVENTION

The present invention is generally directed to the field of electronic pressure sensor devices. More specifically, the present invention is directed to an array of electronic pressure sensor devices and the method of making such devices and arrays.

BACKGROUND OF THE INVENTION

A sensor is a device configured to sense or detect some characteristic of its environment. The sensor senses events or changes in a quantity of the characteristic and provides a corresponding output. In an electronic sensor, the output is generally an electrical or optical signal, although there are other forms of output.

Some electronic sensors, such as electronic pressure sensors, are designed for measuring the applied pressure at an area occupied by the sensor, where pressure is the force applied perpendicular to the surface of the sensor per unit area over which that force is distributed. A pressure sensor typically functions as a transducer in that a signal is generated as a function of the pressure applied. The generated signal is typically an electrical signal. Conventional pressure sensors include a pad for sensing applied pressure and straight wires attached to the pad. Such pressure sensors are often difficult and burdensome to attach to an application substrate, for example requiring the application of adhesive to the application substrate, attachment of pressure sensor to the adhesive, application of conductive glue to connect the pressure sensor pins (straight wires), curing the glue, etc.

SUMMARY OF THE INVENTION

Embodiments are directed to an electronic pressure sensor array having a plurality of conductive electrodes and interconnects selectively formed on a pressure sensor substrate to form a plurality of individual pressure sensor assemblies. The individual pressure sensor assemblies can be aligned in various configurations to form the electronic pressure sensor array. Each pressure sensor assembly is made of a plurality of layers including a pressure sensor substrate, insulating layers on either side of the pressure sensor substrate, and conductive ink layers on an outer surface of each insulating layer. A cavity is formed in each insulating layer, the cavity in one insulating layer being vertically aligned with the cavity in the other insulating layer, and conductive ink fills each cavity to form electrodes.

In an aspect, a pressure sensor assembly is disclosed. The pressure sensor assembly includes a pressure sensitive conductive substrate, a first dielectric layer, a second dielectric layer, a first electrode, a second electrode, a first conductive interconnect, and a second conductive interconnect. The pressure sensitive conductive substrate is configured to enable a current through the pressure sensitive conductive substrate in response to an applied pressure. The first dielectric layer has a first surface coupled to a first surface of the pressure sensitive conductive substrate, wherein the first dielectric layer has a through hole that forms a first cavity. The second dielectric layer has a first surface coupled to a second surface of the pressure sensitive conductive substrate, wherein the second dielectric layer has a through hole that forms a second cavity, further wherein the second cavity is aligned with the first cavity. The first electrode is formed in the first cavity and is electrically coupled to the pressure sensitive conductive substrate. The second electrode is formed in the second cavity and is electrically coupled to the pressure sensitive conductive substrate. The first conductive interconnect is coupled to the first electrode and is selectively patterned on a second surface of the first dielectric layer. The second conductive interconnect is coupled to the second electrode and is selectively patterned on a second surface of the second dielectric layer. In some embodiments, the pressure sensor conductive substrate comprises a carbon embedded sheet. In some embodiments, the pressure sensor conductive substrate comprises a piezo resistive element. In some embodiments, the pressure sensor conductive substrate has a resistivity that changes with applied pressure. In some embodiments, the first electrode and the second electrode are each made of electrically conductive ink. In some embodiments, the electrically conductive ink comprises one of a silver ink, a copper ink or a carbon ink. In some embodiments, the first conductive interconnect and the second conductive interconnect are each made of electrically conductive ink. In some embodiments, the first dielectric layer and the second dielectric layer are each made of a polymer material. In some embodiments, the first dielectric layer and the second dielectric layer are each made of a thermoplastic polyurethane film. In some embodiments, the pressure sensor assembly further comprises a current detection circuit coupled to one of the first conductive interconnect or the second conductive interconnect, wherein a current detected by the current detection circuit corresponds to the current flowing through the pressure sensitive conductive substrate. In some embodiments, the pressure sensor assembly further comprises processing circuitry coupled to the current detection circuit, wherein the processing circuitry is configured to determine the applied pressure according to the detected current.

In another aspect, a pressure sensor array is disclosed. The pressure sensor array comprises a pressure sensitive conductive substrate, a first dielectric layer, a second dielectric layer, a plurality of first electrodes, a plurality of second electrodes, a plurality of first conductive interconnects, and a plurality of second conductive interconnects. The pressure sensitive conductive substrate is configured to enable a current through the pressure sensitive conductive substrate in response to an applied pressure. The first dielectric layer has a first surface coupled to a first surface of the pressure sensitive conductive substrate, wherein the first dielectric layer has a plurality of through holes that form a plurality of first cavities. The second dielectric layer has a first surface coupled to a second surface of the pressure sensitive conductive substrate, wherein the second dielectric layer has a plurality of through holes that form a plurality of second cavities, further wherein each second cavity is aligned with a corresponding one first cavity. Each first electrode is formed in one of the plurality of first cavities and is electrically coupled to the pressure sensitive conductive substrate. Each second electrode is formed in one of the plurality of second cavities and is electrically coupled to the pressure sensitive conductive substrate. Each first conductive interconnect is coupled to one of the plurality of first electrodes and is selectively patterned on a second surface of the first dielectric layer. Each second conductive interconnect is coupled to one of the plurality of second electrode and is selectively patterned on a second surface of the second dielectric layer. In some embodiments, each of the plurality of first conductive interconnects are electrically isolated from each other. In some embodiments, each of the plurality of second conductive interconnects are electrically connected to each other. In some embodiments, the pressure sensor array further comprises a plurality of current detection circuits, one current detection circuit coupled to a corresponding one first conductive interconnect. In some embodiments, the pressure sensor assembly further comprises processing circuitry coupled to the plurality of current detection circuits, wherein each aligned first electrode and second electrode and a portion of the pressure sensitive conductive substrate therebetween correspond to an individual pressure sensor assembly, further wherein the processing circuitry is configured to determine the applied pressure at each individual pressure sensor assembly according to the detected current at each of the plurality of current detection circuits. In some embodiments, the plurality of first conductive interconnects are organized as a plurality of first subgroups, the first conductive interconnects of each first subgroup are electrically connected to each other and electrically isolated from the first conductive interconnects of all other first subgroups. In some embodiments, the plurality of second conductive interconnects are organized as a plurality of second subgroups, the second conductive interconnects of each second subgroup are electrically connected to each other and electrically isolated from the second conductive interconnects of all other second subgroups. In some embodiments, the pressure sensor array further comprises a plurality of current detection circuits, one current detection circuit for and coupled to each first subgroup and each second subgroup. In some embodiments, the pressure sensor conductive substrate comprises a carbon embedded sheet. In some embodiments, the pressure sensor conductive substrate comprises a piezo resistive element. In some embodiments, the pressure sensor conductive substrate has a resistivity that changes with applied pressure. In some embodiments, each of the plurality of first electrodes and each of the plurality of second electrodes are made of electrically conductive ink. In some embodiments, the electrically conductive ink comprises one of a silver ink, a copper ink or a carbon ink. In some embodiments, each of the plurality of first conductive interconnects and each of the plurality of second conductive interconnects are made of electrically conductive ink. In some embodiments, the first dielectric layer and the second dielectric layer are each made of a polymer material. In some embodiments, the first dielectric layer and the second dielectric layer are each made of a thermoplastic polyurethane film.

In yet another aspect, a method of making a pressure sensor assembly is disclosed. The method comprises providing a pressure sensitive conductive substrate configured to enable a current through the pressure sensitive conductive substrate in response to an applied pressure, printing a first dielectric layer onto a first surface of the pressure sensitive conductive substrate, wherein the first dielectric layer has a through hole that forms a first cavity, and printing a second dielectric layer onto a second surface of the pressure sensitive conductive substrate. The second dielectric layer has a through hole that forms a second cavity, and the second cavity is aligned with the first cavity. The method further comprises printing a first electrode in the first cavity, wherein the first electrode is electrically coupled to the pressure sensitive conductive substrate, printing a second electrode in the second cavity, wherein the second electrode is electrically coupled to the pressure sensitive conductive substrate, printing a first conductive interconnect onto the first electrode and onto a surface of the first dielectric layer, and printing a second conductive interconnect onto the second electrode and onto a surface of the second dielectric layer.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to an electronic sensor device. Those of ordinary skill in the art will realize that the following detailed description of the electronic sensor device is illustrative only and is not intended to be in any way limiting. Other embodiments of the electronic sensor device will readily suggest themselves to such skilled persons having the benefit of this disclosure.

Reference will now be made in detail to implementations of the electronic sensor device as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
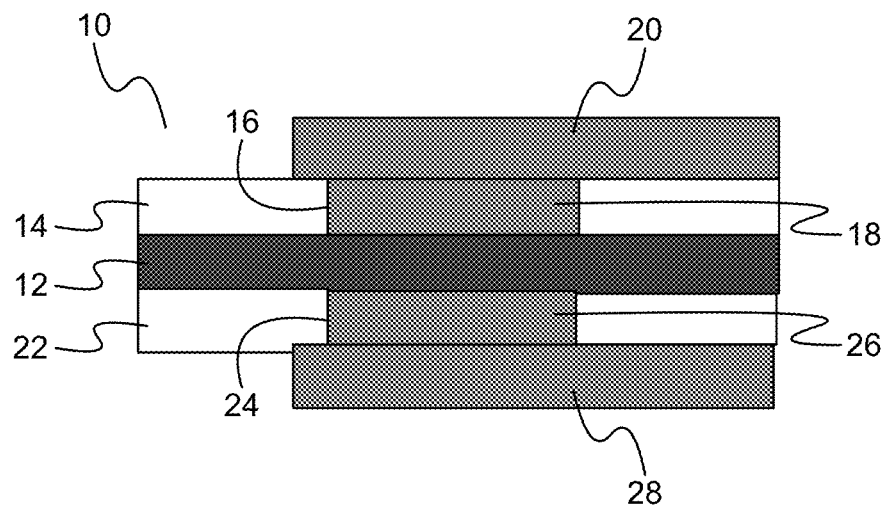
FIG. 1 illustrates a cut-out side view of an electronic pressure sensor assembly according to an embodiment.

FIG. 1 illustrates a cut-out side view of an individual pressure sensor assembly 10 according to an embodiment. The pressure sensor assembly 10 includes a pressure sensor substrate 12, dielectric layers 14 and 22, electrodes 18 and 26, and conductive interconnects 20 and 28. The pressure sensor substrate 12 can be a pressure sensitive conductive substrate, such as a carbon embedded sheet, that functions as a piezo resistive element. Carbon embedded sheets of this type can be sheets commonly known as Velostat® or Linqstat®. The pressure sensitive conductive substrate can also be a film or fabric. It is understood that other conventional pressure sensors can be used as the pressure sensor substrate.

Figure 4:
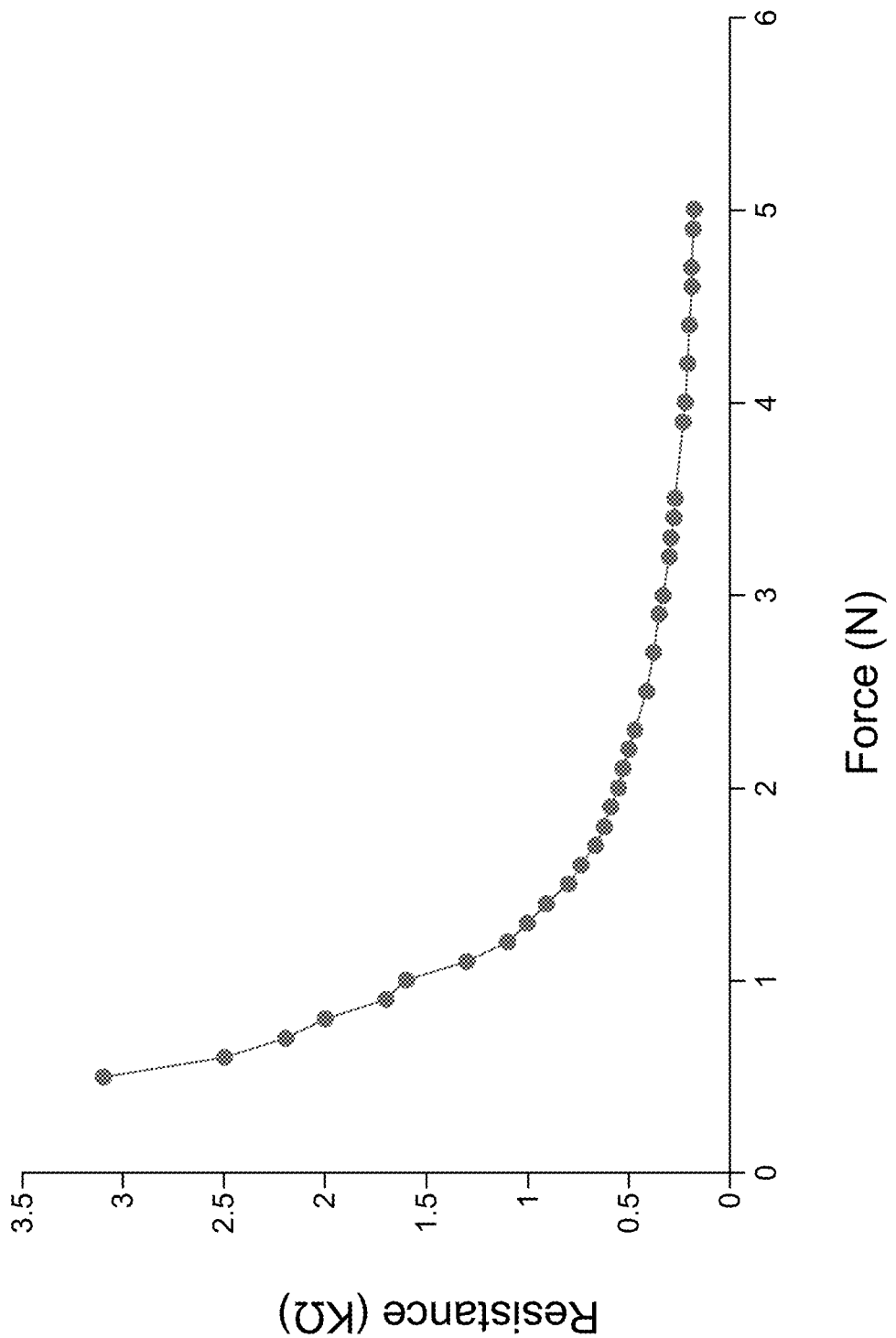
FIG. 4 illustrates an exemplary force versus resistance graph corresponding to an exemplary piezo-resistive element used as a pressure sensitive conductive substrate.

A pressure sensitive conductive substrate becomes less resistive as pressure is applied, enabling current to flow through the substrate in the direction of the applied force. In a static state (no pressure applied), resistance of the pressure sensitive conductive substrate is considered infinite and no current flows through the substrate. When pressure is applied to the pressure sensitive conductive substrate, the resistance value lowers and current flows. The amount of current that flows through the pressure sensitive conductive substrate is a function of the applied pressure. Greater pressure results in reduced resistance and increased current. The force to resistance relationship for a given pressure sensitive conductive substrate can be established. FIG. 4 illustrates an exemplary force versus resistance graph corresponding to an exemplary piezo-resistive element used as a pressure sensitive conductive substrate. In general, the more linear the force to resistance curve, the more accurate the predictive capability of the relationship. The resistance across the pressure sensitive conductive substrate can be determined by measuring a current through a thickness of the pressure sensitive conductive substrate, where the thickness of the pressure sensitive conductive substrate is parallel to a direction of the applied force. The measured current is used to determine a corresponding resistance, for example, via a look-up table. The determined resistance corresponds to a specific applied pressure according to the force to resistance curve for the pressure sensitive conductive substrate.

Figure 2:
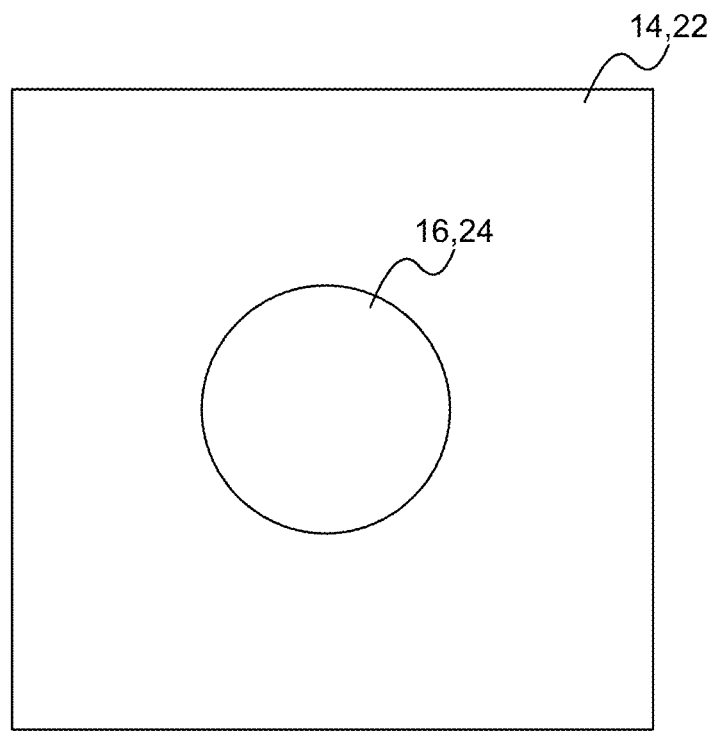
FIG. 2 illustrates a top down view of the dielectric layer 14 in FIG. 1.

The dielectric layer 14 includes a through hole that forms a cavity 16, and the dielectric layer 22 includes a through hole that forms a cavity 24. FIG. 2 illustrates a top down view of the dielectric layer 14 or 22 with cavity 16 or 24. In general, each dielectric layer 14, 22 is made of an electrically non-conductive material. In some embodiments, each dielectric layer 14, 22 is made of a TPU (thermoplastic polyurethane) film or urethane. The electrode 18 is formed in the cavity 16, and the electrode 26 is formed in the cavity 24. The electrodes 18, 26 are made of electrically conductive material, such as conductive ink. The conductive interconnect 20 is selectively patterned on an exposed surface of the dielectric layer 14 and on the electrode 18 to form an electrical interconnection between the electrode 18 and the conductive interconnect 20. The conductive interconnect 28 is selectively patterned on an exposed surface of the dielectric layer 22 and on the electrode 26 to form an electrical interconnection between the electrode 26 and the conductive interconnect 28. The conductive interconnects 20, 28 are made of electrically conductive material, such as conductive ink. The conductive ink, used for the electrodes 18, 26 and/or the conductive interconnects 20, 28, can be silver ink, carbon ink, or ink with other metals, such as copper or nickel, or some combination of metals.

Figure 3:
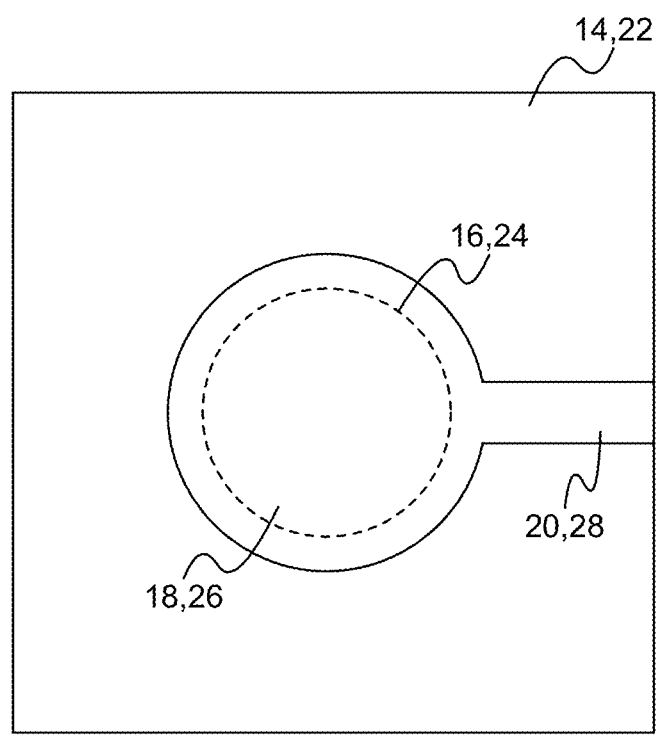
FIG. 3 illustrates a top down view or a bottom up view of the pressure sensor assembly 10.

FIG. 3 illustrates a top down view or a bottom up view of the pressure sensor assembly 10. The electrodes 18, 26 are shown in ghost form for illustrative purposes, although each are covered by corresponding conductive interconnects 20, 28. The conductive interconnects 20, 28 each have an enlarged portion, referred to as a conductive pad portion, that covers the electrode 18, 26 and a trace portion that extends away from the conductive pad portion. The trace portion forms a conductive trace that can be connected to other conductive traces or electronic components (not shown), such that the pressure sensor assembly 10 is part of a larger circuit. Although the shape of the electrodes and conductive pad portions of the conductive interconnects are shown to be circular, it is understood that alternative shapes can be used. In some embodiments, a protective insulation layer (not shown) is applied over the conductive interconnects 20, 28.

When sufficient force is applied to the pressure sensor assembly 10, the pressure sensor substrate 12 enables current flow. A current path is formed between the pressure sensor substrate 12, the electrode 18, and the conductive interconnect 20. A circuit path connected to the conductive interconnect 20 is connected to the conductive interconnect 28, which can function as ground, thereby completing the current loop back to the pressure sensor substrate 12 via the electrode 26. At some point in this current loop, the current can be measured and the measure current used to calculate the corresponding force applied to the pressure sensor assembly 10. One of the conductive interconnects is connected to a detection circuit (not shown) configured to detect or measure a current through the corresponding pressure sensor assembly. A processing circuit (not shown) is connected to the detection circuit to determine an applied pressure according to the measured current. It is understood that the precessing circuit can be any conventional processing or control circuitry including, but not limited to, a micro-processing unit (MPU), a central processing unit (CPU), or the like.

Figure 5:
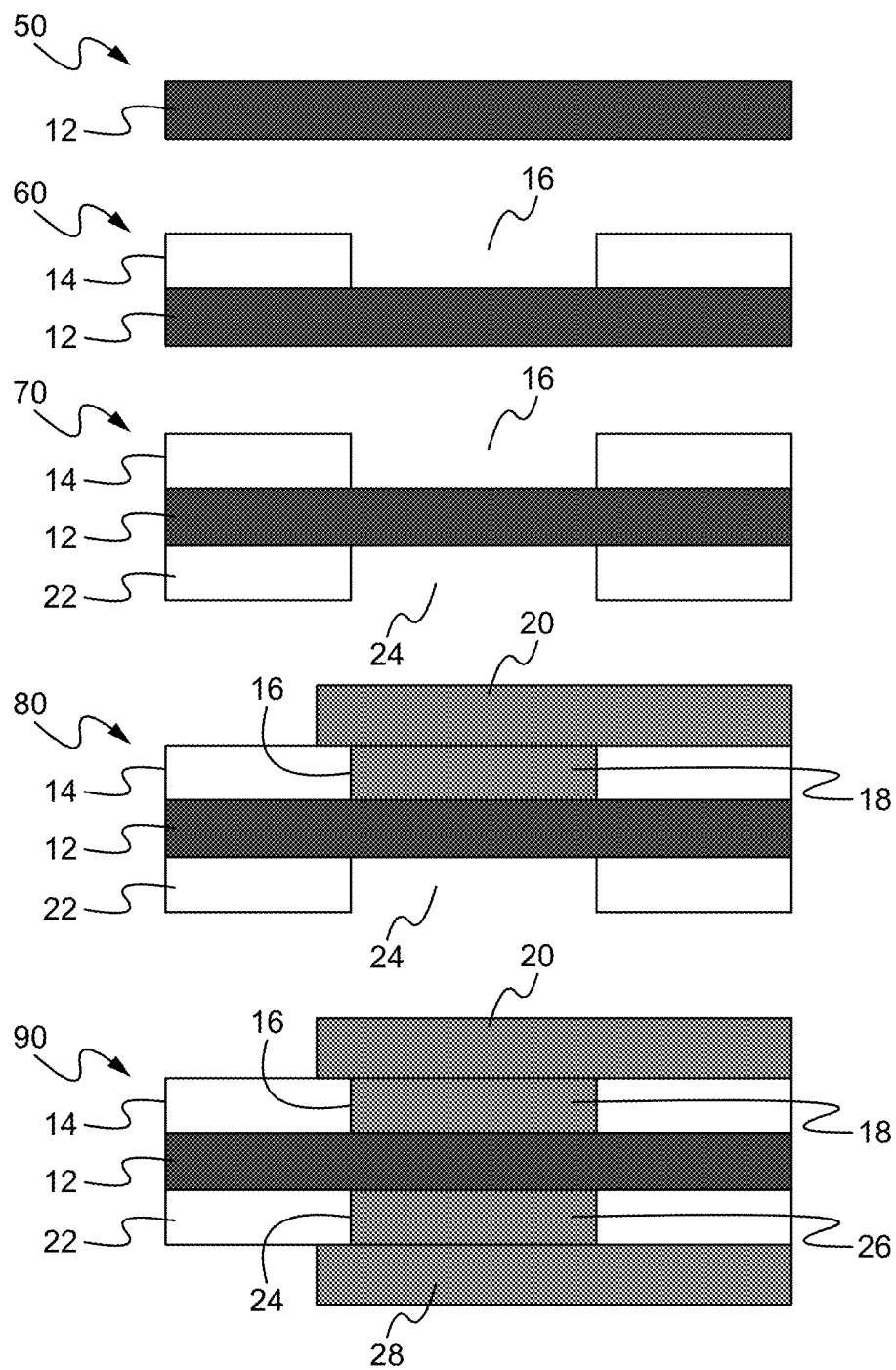
FIG. 5 illustrates a method of fabricating an pressure sensor assembly according to an embodiment.

Various processes can be used to fabricate the pressure sensor assembly 10. FIG. 5 illustrates a method of fabricating an pressure sensor assembly according to an embodiment. The method shown in FIG. 5 is shown and described in terms of the pressure sensor assembly 10 of FIG. 1. It is understood that the method steps can be generally applied to make alternatively configured pressure sensor assemblies. At the step 50, the pressure sensor substrate 12 is provided. In this exemplary configuration, a piezo-resistive carbon embedded sheet is selected and provided as the pressure sensor substrate. At the step 60, the dielectric layer 14 is applied to a first surface of the pressure sensor substrate 12. In some embodiments, the dielectric layer 14 is selectively printed onto the first surface of the pressure sensor substrate 12. The dielectric layer 14 is selectively printed such that the cavity 16 is formed. In some embodiments, the material used for the dielectric layer 14 is a polymer material including, but not limited to, epoxy, polyimide, urethane, and silicone. It is understood that alternative conventional dielectric materials can be used. Any conventional printing technique can be used including, but not limited to, screen printing and ink jet printing. The dielectric layer material is then cured, such as by applying UV (ultraviolet) light or heat, according to the type of material used. UV curable inks show good adhesion to textile, good flexibility, and surface smoothness. These dielectric inks can be used as an interface layer or ink printing substrate, and can be used as an encapsulant after subsequent ink printing, such as the printing of electrodes and conductive interconnects. In other embodiments, the dielectric layer 14 is a preformed substrate, such as a TPU film. The cavity 16 is formed in the preformed substrate. The preformed substrate with cavity is then attached to the first surface of the pressure sensor substrate, such as by using adhesive and/or lamination. At the step 70, after the dielectric layer 14 is applied at the step 60, the dielectric layer 22 is applied to a second surface of the pressure sensor substrate. In some embodiments, the dielectric layer 22 is selectively printed onto a second surface of the pressure sensor substrate 12. The dielectric layer 22 is selectively printed such that the cavity 24 is formed. The material used for printing the dielectric layer 22 can be the same or different than the material used for printing the dielectric layer 14. The dielectric layer material is then cured. In other embodiments, the dielectric layer 22 is a preformed substrate, such as a TPU film. The cavity 24 is formed in the preformed substrate. The preformed substrate with cavity is then attached to the second surface of the pressure sensor substrate, such as by using adhesive and/or lamination.

At the step 80, conductive ink is printed into the cavity 16 and selectively printed onto the exposed surface of the dielectric layer 14 to form the electrode 18 and the conductive interconnects 20. In some embodiments, the conductive ink can be silver ink, carbon ink, or ink with other metals, such as copper or nickel, or some combination of metals. Any conventional printing technique can be used to print the electrode and conductive interconnect including, but not limited to, screen printing and ink jet printing. The printed conductive ink is then cured, such as by applying UV light or heat, according to the type of conductive ink used.

At the step 90, after the electrode 18 and the conductive interconnect 20 are cured, conductive ink is printed into the cavity 24 and selectively printed onto the exposed surface of the dielectric layer 22 to form the electrode 26 and the conductive interconnects 28. The printed conductive ink is then cured. It is understood that the steps 80 and 90 can be reversed.

An insulation layer can be applied over the conductive interconnects 20, 28, except for terminal connection areas (not shown). In some embodiments, the insulation layer is a polymer. It is understood that other insulating materials can be used. It is understood that the order of the various steps described above can be interchanged, rearranged or combined.

Figure 6:
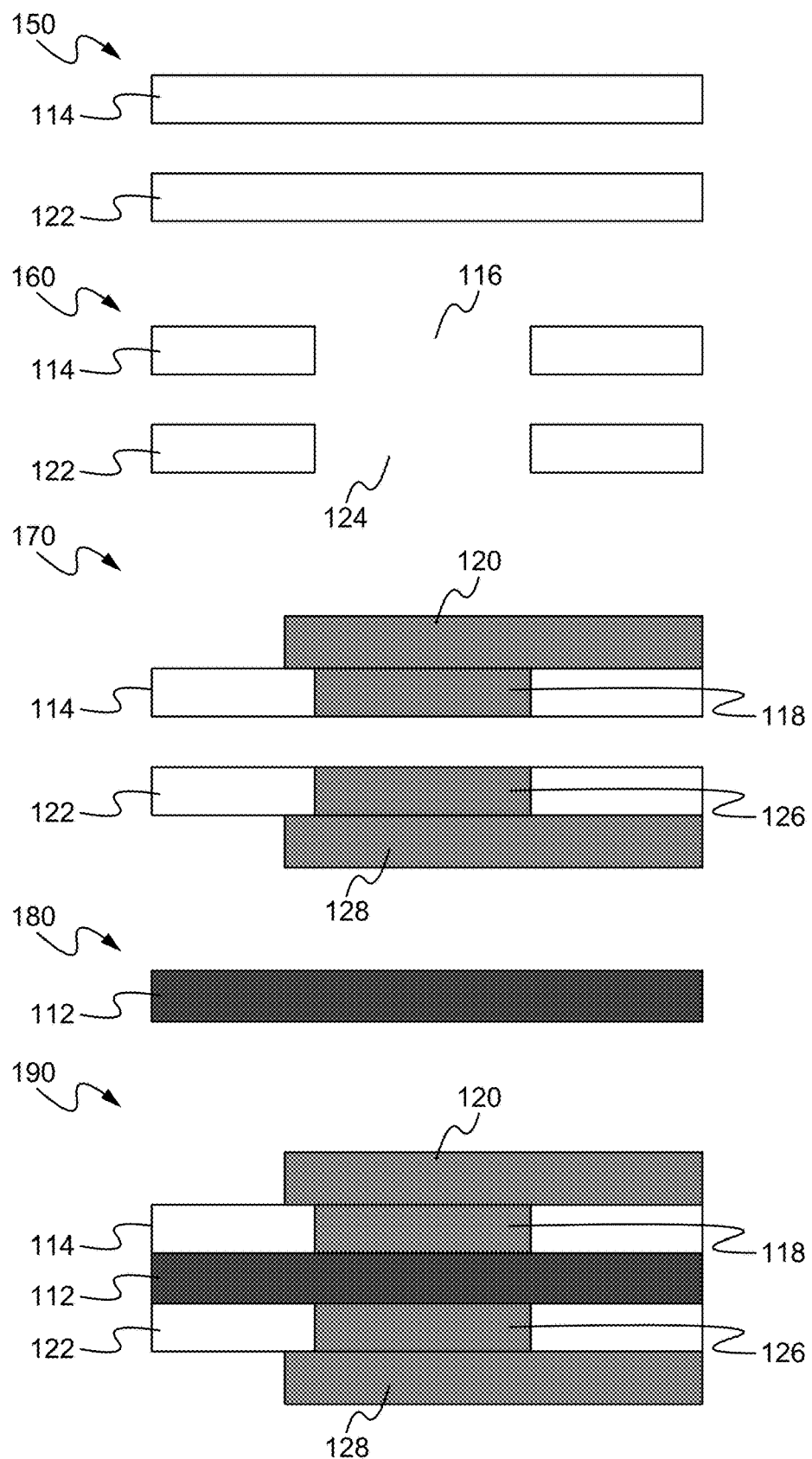
FIG. 6 illustrates a method of fabricating a pressure sensor assembly according to another embodiment.

In another fabrication process, the dielectric layers and conductive interconnects can be separately formed from the pressure sensor substrate, then laminated together to form the pressure sensor assembly. FIG. 6 illustrates a method of fabricating a pressure sensor assembly according to another embodiment. The pressure sensor assembly fabricated using the method shown in FIG. 6 has the same function as the pressure sensor assembly 10 shown in FIG. 1 and uses the same materials, unless otherwise specified. It is understood that the method steps can be generally applied to make alternatively configured pressure sensor assemblies. At the step 150, a dielectric layer 114 and a dielectric layer 122 are provided. In some embodiments, each of the dielectric layers 114, 122 is a TPU film. It is understood that other dielectric materials can be used. At the step 160, a through hole is made in the dielectric layer 114 to form a cavity 116, and a through hole is made in the dielectric layer 122 to form a cavity 124.

At the step 170, conductive ink is printed into the cavity 116 and selectively printed onto a first surface of the dielectric layer 114 to form an electrode 118 and a conductive interconnects 120. The printed conductive ink is then cured, such as by applying UV light or heat, according to the type of conductive ink used. Similarly, conductive ink is printed into the cavity 124 and selectively printed onto a first surface of the dielectric layer 122 to form an electrode 126 and a conductive interconnects 128. The printed conductive ink is then cured.

At the step 180, a pressure sensor substrate 112 is provided. In this exemplary configuration, a piezo-resistive carbon embedded sheet is selected and provided as the pressure sensor substrate.

At the step 190, the dielectric layer 114 with electrode 118 and conductive interconnect 120, the pressure sensor substrate 112, and the dielectric layer 122 with electrode 126 and conductive interconnect 128 are stacked and laminated together. In some embodiments, when lamination is performed, the pressure is only selectively applied so that pressure is applied to areas surrounding the electrodes but not on the area aligned with the electrodes. This minimizes the electrode material from penetrating the pressure sensor substrate material. This also enables micro-gaps to be maintained between the conductive ink that forms the electrode in the cavity and the pressure sensor substrate material. Having such micro-gaps establishes a high initial resistance (static state resistance of the pressure sensor). The micro-gaps may be 1 micron or less. In such a configuration, the electrode is lying on the surface of the pressure sensor substrate (non-compacted, non-bonded). Applying pressure would compact (bond) the conductive ink of the electrode to the pressure sensor substrate, thereby reducing a static state resistance.

An insulation layer can be applied over the conductive interconnects 120, 128, except for terminal connection areas (not shown). In some embodiments, the insulation layer is a polymer. It is understood that other insulating materials can be used. It is understood that the order of the various steps described above can be interchanged, rearranged or combined.

The pressure sensor assembly can be configured as a single component within a larger circuit, as described above. Alternatively, multiple pressure sensor assemblies can be selectively arranged as an array of pressure sensor assemblies. The array of pressure sensor assemblies can be used to measure pressure distribution across a large area, such as a door mat or an entire room surface. In some embodiments, the pressure sensor substrate and dielectric layers of each individual pressure sensor assembly are physically isolated from corresponding layers of other pressure sensor assemblies. In such a configuration, the individual pressure sensor assemblies can be mounted to a common non-electrically conductive substrate, and each individual pressure sensor assembly can be interconnected with other pressure sensor assemblies or circuit elements using a conductive interconnect, such as conductive interconnects 20 or 28. In other embodiments, manufacturing of an array of pressure sensor assemblies can be simplified by making the pressure sensor assemblies with common layers. For example, a single sheet of pressure sensor substrate can be used with a first dielectric layer formed on a first surface of the pressure sensor substrate sheet, and a plurality of cavities are formed in the first dielectric layer where each cavity corresponds to an individual pressure sensor assembly. A second dielectric layer with corresponding plurality of cavities is formed on a second surface of the pressure sensor substrate sheet. Conductive electrodes are formed in each of the cavities, and conductive interconnects are formed connecting to each of the electrodes. Only the areas where the pressure is applied show the electrical resistance change. Untouched areas maintain stable resistance, and therefore current flow between individual pressure sensor assemblies through the pressure sensor substrate is prevented. In some embodiments, the thickness of the pressure sensor substrate is 4 mil or greater, depending on the design and material used, to show good electrical resistance response and sensitivity.

Figure 7:
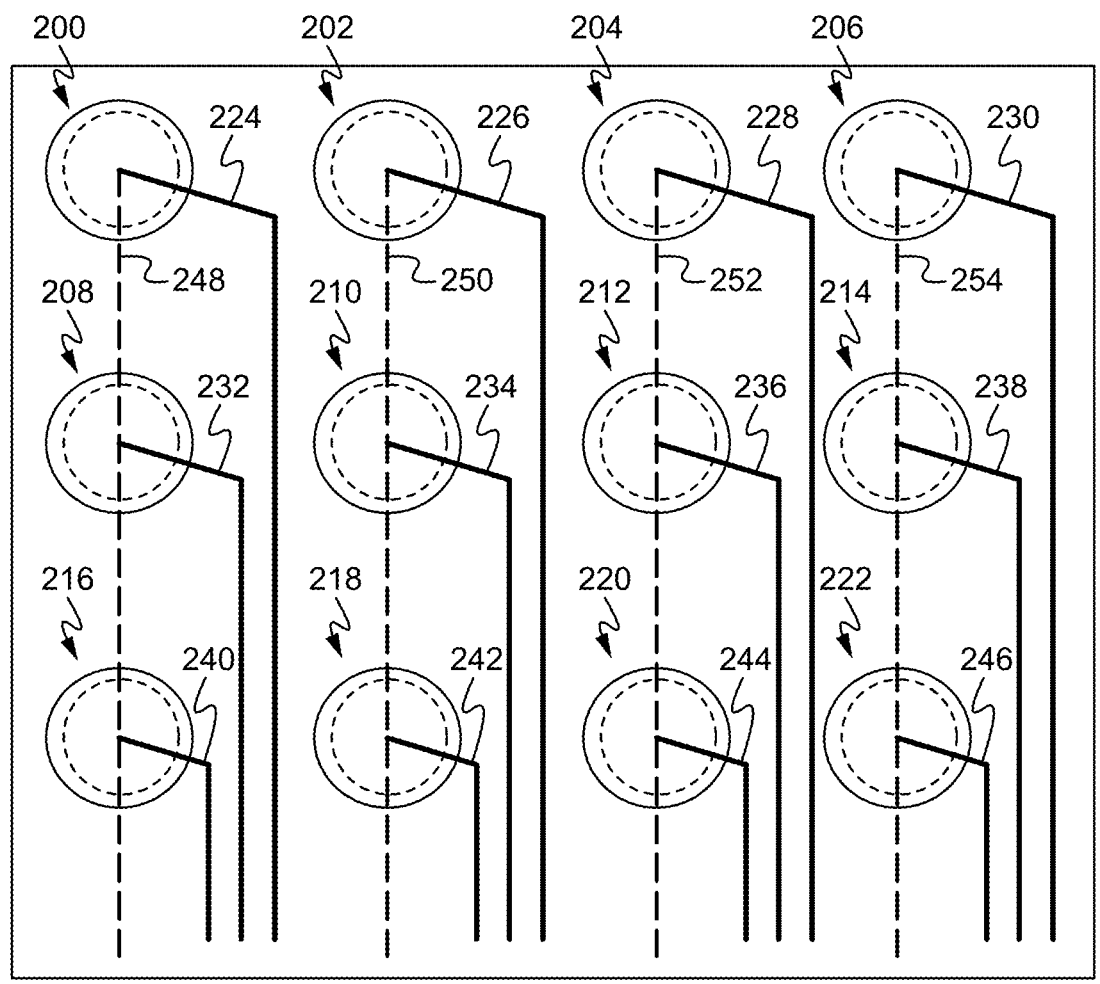
FIG. 7 illustrates a top down view of an array of pressure sensor assemblies according to an embodiment.

The array of pressure sensor assemblies can be interconnected using the conductive interconnects in any manner depending on the application. For example, in some embodiments, the conductive interconnects connected to the top electrodes, such as electrode 18 in FIG. 1, are all independent from each other, and the conductive interconnects connected to the bottom electrodes, such as electrode 26 in FIG. 1, are all independent from each other. However, such a configuration requires twice as many conductive interconnects as pressure sensor assemblies in the array. This number of interconnects may not be the most efficient layout for providing connectivity, nor may this configuration be feasible within the physical constraints available. As such, alternative configurations are contemplated where one or more electrodes are commonly connected so as to reduce the total number of conductive interconnects needed for the entire array. FIG. 7 illustrates a top down view of an array of pressure sensor assemblies according to an embodiment. Each of the individual pressure sensor assemblies 200-222 are of the type described above, such as pressure sensor assembly 10 in FIG. 1. Each pressure sensor assembly 200-222 includes a corresponding top conductive interconnect 224-246, each analogous to conductive interconnect 20 in FIG. 1. Each of the conductive interconnects 224-226 are electrically isolated from each other and can be connected to a corresponding one detection circuit for determining a current on the conductive current. Each column within the array of pressure sensor assemblies has commonly connected bottom conductive interconnects. For example, as shown in FIG. 7, the bottom conductive interconnects, analogous to conductive interconnect 28 in FIG. 1, of pressure sensor assemblies 200, 208, 216 are commonly connected by conductive interconnect 248 (shown as a dashed line in FIG. 7 to indicate the conductive interconnect 248 is on the backside of the array). Similarly, the bottom conductive interconnects of pressure sensor assemblies 202, 210, 218 are commonly connected by conductive interconnect 250, the bottom conductive interconnects of pressure sensor assemblies 204, 212, 220 are commonly connected by conductive interconnect 252, and the bottom conductive interconnects of pressure sensor assemblies 206, 214, 222 are commonly connected by conductive interconnect 254. In some embodiments, each of the conductive interconnects 248, 250, 252, 254 are coupled to common ground. In some embodiments, each of the individual conductive interconnects 248, 250, 252, 254 is replaced by a common ground plane that extends over the backside of the array, eliminating the need to form selectively patterned conductive interconnects on the backside of the array.

Figure 8:
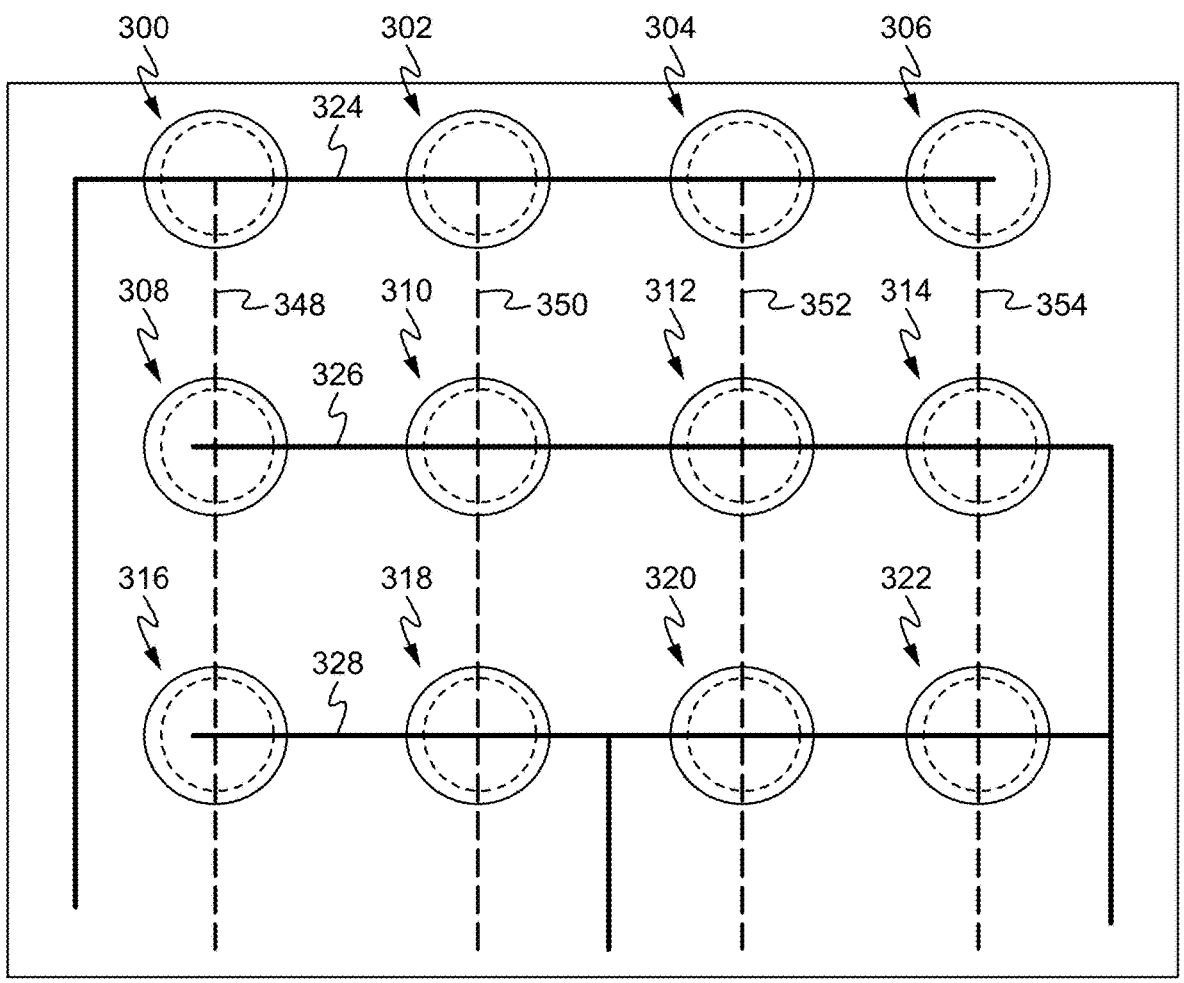
FIG. 8 illustrates a top down view of an array of pressure sensor assemblies according to another embodiment.

Select conductive interconnects can also be commonly interconnected on the top side of the array. FIG. 8 illustrates a top down view of an array of pressure sensor assemblies according to another embodiment. Each of the individual pressure sensor assemblies 300-322 are of the type described above, such as pressure sensor assembly 10 in FIG. 1. Each row within the array of pressure sensor assemblies has commonly connected top conductive interconnects, and each column within the array of pressure sensor assemblies has commonly connected bottom conductive interconnects. For example, as shown in FIG. 8, the top conductive interconnects, analogous to conductive interconnect 20 in FIG. 1, of pressure sensor assemblies 300, 302, 304, 306 are commonly connected by conductive interconnect 324, the top conductive interconnects of pressure sensor assemblies 308, 310, 312, 314 are commonly connected by conductive interconnect 326, and the top conductive interconnects of pressure sensor assemblies 316, 318, 320, 322 are commonly connected by conductive interconnect 328. Similarly, the bottom conductive interconnects, analogous to conductive interconnect 28 in FIG. 1, of pressure sensor assemblies 300, 308, 316 are commonly connected by conductive interconnect 348 (shown as a dashed line in FIG. 8 to indicate the conductive interconnect 348 is on the backside of the array). Similarly, the bottom conductive interconnects of pressure sensor assemblies 302, 310, 318 are commonly connected by conductive interconnect 350, the bottom conductive interconnects of pressure sensor assemblies 304, 312, 320 are commonly connected by conductive interconnect 352, and the bottom conductive interconnects of pressure sensor assemblies 306, 314, 322 are commonly connected by conductive interconnect 354. Each of the conductive interconnects 324-328 and 348-354 are electrically isolated from each other and can be connected to a corresponding one detection circuit for determining a current on the corresponding conductive interconnect. The measured currents for the rows and columns can be compared to determine a current flow through a given pressure sensor assembly. It is understood that other common groupings of top electrodes and bottom electrodes than that shown in FIGS. 7 and 8 can be configured.

The present application has been described in terms of specific embodiments incorporating details to facilitate the understanding of the principles of construction and operation of the electronic sensor device. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A pressure sensor assembly comprising:
   a. a pressure sensitive conductive substrate configured to enable a current through the pressure sensitive conductive substrate in response to an applied pressure;
   b. a first dielectric layer having a first surface coupled to a first surface of the pressure sensitive conductive substrate, wherein the first dielectric layer has a first through hole that forms a first cavity;
   c. a second dielectric layer having a first surface coupled to a second surface of the pressure sensitive conductive substrate, wherein the second dielectric layer has a second through hole that forms a second cavity, further wherein the second cavity is vertically aligned with the first cavity;
   d. a first electrode formed in the first cavity and electrically coupled to the pressure sensitive conductive substrate;
   e. a second electrode formed in the second cavity and electrically coupled to the pressure sensitive conductive substrate;
   f. a first conductive interconnect coupled to the first electrode and selectively patterned on a second surface of the first dielectric layer; and
   g. a second conductive interconnect coupled to the second electrode and selectively patterned on a second surface of the second dielectric layer.

2. The pressure sensor assembly of claim 1 wherein the pressure sensor conductive substrate comprises a carbon embedded sheet.

3. The pressure sensor assembly of claim 1 wherein the pressure sensor conductive substrate comprises a piezo resistive element.

4. The pressure sensor assembly of claim 1 wherein the pressure sensor conductive substrate has a resistivity that changes with applied pressure.

5. The pressure sensor assembly of claim 1 wherein the first electrode and the second electrode are each made of electrically conductive ink.

6. The pressure sensor assembly of claim 5 wherein the electrically conductive ink comprises one of a silver ink, a copper ink or a carbon ink.

7. The pressure sensor assembly of claim 1 wherein the first conductive interconnect and the second conductive interconnect are each made of electrically conductive ink.

8. The pressure sensor assembly of claim 1 wherein the first dielectric layer and the second dielectric layer are each made of a polymer material.

9. The pressure sensor assembly of claim 1 wherein the first dielectric layer and the second dielectric layer are each made of a thermoplastic polyurethane film.

10. The pressure sensor assembly of claim 1 further comprising a current detection circuit coupled to one of the first conductive interconnect or the second conductive interconnect, wherein a current detected by the current detection circuit corresponds to the current flowing through the pressure sensitive conductive substrate.

11. The pressure sensor assembly of claim 10 further comprising processing circuitry coupled to the current detection circuit, wherein the processing circuitry is configured to determine the applied pressure according to the detected current.

12. A pressure sensor array comprising:
   a. a pressure sensitive conductive substrate configured to enable a current through the pressure sensitive conductive substrate in response to an applied pressure;
   b. a first dielectric layer having a first surface coupled to a first surface of the pressure sensitive conductive substrate, wherein the first dielectric layer has a plurality of first through holes that form a plurality of first cavities;
   c. a second dielectric layer having a first surface coupled to a second surface of the pressure sensitive conductive substrate, wherein the second dielectric layer has a plurality of second through holes that form a plurality of second cavities, further wherein each second cavity is vertically aligned with a corresponding one first cavity;
   d. a plurality of first electrodes, each first electrode is formed in one of the plurality of first cavities and electrically coupled to the pressure sensitive conductive substrate;
   e. a plurality of second electrodes, each second electrode is formed in one of the plurality of second cavities and electrically coupled to the pressure sensitive conductive substrate;
   f. a plurality of first conductive interconnects, each first conductive interconnect is coupled to one of the plurality of first electrodes and selectively patterned on a second surface of the first dielectric layer; and
   g. a plurality of second conductive interconnects, each second conductive interconnect is coupled to one of the plurality of second electrode and selectively patterned on a second surface of the second dielectric layer.

13. The pressure sensor array of claim 12 wherein each of the plurality of first conductive interconnects are electrically isolated from each other.

14. The pressure sensor array of claim 13 wherein each of the plurality of second conductive interconnects are electrically connected to each other.

15. The pressure sensor array of claim 14 further comprising a plurality of current detection circuits, one of the plurality of current detection circuits coupled to a corresponding one first conductive interconnect.

16. The pressure sensor assembly of claim 15 further comprising a processing circuitry coupled to the plurality of current detection circuits, wherein each vertically aligned first electrode and second electrode and a portion of the pressure sensitive conductive substrate therebetween correspond to an individual pressure sensor assembly, further wherein the processing circuitry is configured to determine the applied pressure at each individual pressure sensor assembly according to the detected current at each of the plurality of current detection circuits.

17. The pressure sensor array of claim 12 where the plurality of first conductive interconnects are organized as a plurality of first subgroups, the first conductive interconnects of each first subgroup are electrically connected to each other and electrically isolated from the first conductive interconnects of all other first subgroups.

18. The pressure sensor array of claim 15 where the plurality of second conductive interconnects are organized as a plurality of second subgroups, the second conductive interconnects of each second subgroup are electrically connected to each other and electrically isolated from the second conductive interconnects of all other second subgroups.

19. The pressure sensor array of claim 18 further comprising a plurality of current detection circuits, one of the plurality of current detection circuits for and coupled to each first subgroup and each second subgroup.

20. The pressure sensor assembly of claim 19 further comprising processing circuitry coupled to the plurality of current detection circuits, wherein each vertically aligned first electrode and second electrode and a portion of the pressure sensitive conductive substrate therebetween correspond to an individual pressure sensor assembly, further wherein the processing circuitry is configured to determine the applied pressure at each individual pressure sensor assembly according to the detected current at each of the plurality of current detection circuits.

21. The pressure sensor array of claim 12 wherein the pressure sensor conductive substrate comprises a carbon embedded sheet.

22. The pressure sensor array of claim 12 wherein the pressure sensor conductive substrate comprises a piezo resistive element.

23. The pressure sensor array of claim 12 wherein the pressure sensor conductive substrate has a resistivity that changes with applied pressure.

24. The pressure sensor array of claim 12 wherein each of the plurality of first electrodes and each of the plurality of second electrodes are made of electrically conductive ink.

25. The pressure sensor array of claim 24 wherein the electrically conductive ink comprises one of a silver ink, a copper ink or a carbon ink.

26. The pressure sensor array of claim 12 wherein each of the plurality of first conductive interconnects and each of the plurality of second conductive interconnects are made of electrically conductive ink.

27. The pressure sensor array of claim 12 wherein the first dielectric layer and the second dielectric layer are each made of a polymer material.

28. The pressure sensor array of claim 12 wherein the first dielectric layer and the second dielectric layer are each made of a thermoplastic polyurethane film.

29. A method of making a pressure sensor assembly, the method comprising:
   a. providing a pressure sensitive conductive substrate configured to enable a current through the pressure sensitive conductive substrate in response to an applied pressure;
   b. printing a first dielectric layer onto a first surface of the pressure sensitive conductive substrate, wherein the first dielectric layer has a first through hole that forms a first cavity;

c. printing a second dielectric layer onto a second surface of the pressure sensitive conductive substrate, wherein the second dielectric layer has a second through hole that forms a second cavity, further wherein the second cavity is vertically aligned with the first cavity;
d. printing a first electrode in the first cavity, wherein the first electrode is electrically coupled to the pressure sensitive conductive substrate;
e. printing a second electrode in the second cavity, wherein the second electrode is electrically coupled to the pressure sensitive conductive substrate;
f. printing a first conductive interconnect onto the first electrode and onto a surface of the first dielectric layer; and
g. printing a second conductive interconnect onto the second electrode and onto a surface of the second dielectric layer.

* * * * *